(12) United States Patent
Sato (10) Patent No.: US 9,266,525 B2
(45) Date of Patent: Feb. 23, 2016

(54) VEHICLE, METHOD FOR CONTROLLING VEHICLE, AND CONTROL DEVICE OF VEHICLE

(75) Inventor: Keita Sato, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 8 days.

(21) Appl. No.: 14/233,047

(22) PCT Filed: Aug. 8, 2011

(86) PCT No.: PCT/JP2011/068045
§ 371 (c)(1),
(2), (4) Date: Jan. 15, 2014

(87) PCT Pub. No.: WO2013/021446
PCT Pub. Date: Feb. 14, 2013

(65) Prior Publication Data
US 2014/0163801 A1    Jun. 12, 2014

(51) Int. Cl.
*B60W 20/00* (2006.01)
*B60K 6/445* (2007.10)
*B60W 10/06* (2006.01)
*B60W 50/06* (2006.01)
(Continued)

(52) U.S. Cl.
CPC ............... *B60W 20/00* (2013.01); *B60K 6/445* (2013.01); *B60W 10/06* (2013.01); *B60W 10/08* (2013.01); *B60W 10/26* (2013.01); *B60W 20/106* (2013.01); *B60W 20/40* (2013.01); *B60W 50/06* (2013.01); *B60W 2510/244* (2013.01); *B60W 2710/244* (2013.01); *Y02T 10/6239* (2013.01); *Y02T 10/6286* (2013.01); *Y10S 903/903* (2013.01)

(58) Field of Classification Search
CPC ..... B60W 20/00; B60W 10/06; B60W 50/06; B60W 2710/244; B60W 10/08; Y10S 903/903; Y02T 10/6239; Y02T 10/6286; B60K 6/445
See application file for complete search history.

(56) References Cited

U.S. PATENT DOCUMENTS 4,757,463 A * 7/1988 Ballou et al. ............... 701/33.6
5,343,970 A * 9/1994 Severinsky ............ B60K 6/387
180/165

(Continued)

FOREIGN PATENT DOCUMENTS

| JP | 2002-262401 A | 9/2002 |
| JP | 2004-166350 A | 6/2004 |

(Continued)

OTHER PUBLICATIONS

Machine translation of JP 2009-18743A (dated Sep. 15, 2014)http://www4.ipdl.inpit.go.jp/Tokujitu/tjsogodbenk.ipdl.*

Primary Examiner — John R Olszewski
Assistant Examiner — Jean-Paul Cass
(74) Attorney, Agent, or Firm — Sughrue Mion, PLLC (57) ABSTRACT

A vehicle includes an engine, a battery storing electric power generated by operating the engine, and an ECU allowing the engine to stop in the state where a remaining capacity of the battery is larger than a first threshold value. When the engine is started by a factor different from a reduction in the remaining capacity of the battery in the state where the remaining capacity of the battery is smaller than the first threshold value, ECU causes the engine to operate and causes the battery to be charged until the remaining capacity of the battery increases to a second threshold value which is larger than the first threshold value.

4 Claims, 10 Drawing Sheets (51) Int. Cl.
  *B60W 10/08* (2006.01)
  *B60W 10/26* (2006.01)

(56) References Cited

U.S. PATENT DOCUMENTS

| | | | | |
|---|---|---|---|---|
| 5,924,395 A * | 7/1999 | Moriya | ................ | B60K 6/46 123/179.18 |
| 6,034,507 A * | 3/2000 | Ikawa | ................ | B60L 11/1864 320/132 |
| 6,316,842 B1 * | 11/2001 | Kuroda | ................ | B60K 6/48 180/65.25 |
| 6,338,391 B1 * | 1/2002 | Severinsky | ............ | B60K 6/442 180/65.23 |
| 6,424,157 B1 * | 7/2002 | Gollomp | ............ | G01R 31/006 320/132 |
| 6,434,453 B1 * | 8/2002 | Kuroda | ................ | B60K 6/485 123/325 |
| 6,480,767 B2 * | 11/2002 | Yamaguchi | ............ | B60K 6/46 180/165 |
| 6,550,557 B2 * | 4/2003 | Wakashiro | ............ | B60K 6/485 180/170 |
| 6,573,675 B2 * | 6/2003 | Schmitz | ................ | B60L 3/0046 180/65.245 |
| 7,806,095 B2 * | 10/2010 | Cook | ................ | F02N 11/0866 123/179.3 |
| 7,899,588 B2 * | 3/2011 | Soma | ................ | H01M 10/48 701/22 |
| 8,256,547 B2 * | 9/2012 | Ichikawa | ............ | B60K 6/445 180/65.265 |
| 8,307,928 B2 * | 11/2012 | Mack | ................ | B60K 6/445 180/65.28 |
| 8,558,512 B2 * | 10/2013 | Iles | ................ | H01M 10/4257 180/65.1 |
| 8,578,904 B2 * | 11/2013 | Sakuma | ................ | B60K 6/48 123/179.1 |
| 8,612,078 B2 * | 12/2013 | Schulte | ................ | B60W 20/106 180/65.21 |
| 8,781,659 B2 * | 7/2014 | Kim | ................ | B60W 10/06 180/65.21 |
| 8,781,664 B2 * | 7/2014 | Sujan | ................ | B60W 10/02 180/65.25 |
| 9,145,125 B2 * | 9/2015 | Endo | ................ | B60W 10/06 |
| 9,150,218 B2 * | 10/2015 | Makabe | ................ | B60W 20/40 |
| 2002/0084769 A1 | 7/2002 | Iritani et al. | | |
| 2004/0015282 A1 * | 1/2004 | Babala et al. | ................ | 701/70 |
| 2005/0067200 A1 * | 3/2005 | Jiang | ................ | B60K 6/48 180/65.25 |
| 2005/0103545 A1 * | 5/2005 | Green et al. | ................ | 180/168 |
| 2009/0121776 A1 * | 5/2009 | Nagase | ................ | 327/434 |
| 2009/0188733 A1 * | 7/2009 | Mack | ................ | B60K 6/445 180/65.285 |
| 2010/0006359 A1 * | 1/2010 | Ang | ................ | B60K 6/445 180/65.285 |
| 2010/0010698 A1 * | 1/2010 | Iwashita | ................ | B60L 3/12 701/22 |
| 2010/0140001 A1 * | 6/2010 | Oe | ................ | B60K 6/365 180/65.275 |
| 2010/0181829 A1 * | 7/2010 | Ichikawa | ............ | B60L 11/1861 307/9.1 |
| 2012/0101677 A1 * | 4/2012 | Ikegami | ................ | B60K 6/48 701/22 |
| 2012/0197472 A1 * | 8/2012 | He | ................ | B60K 6/105 701/22 |
| 2013/0297193 A1 * | 11/2013 | Morisaki | ................ | B60K 6/445 701/112 |
| 2014/0221156 A1 * | 8/2014 | Sugimura | ............ | B60W 10/06 477/83 |

FOREIGN PATENT DOCUMENTS

| | | |
|---|---|---|
| JP | 2009018743 A | 1/2009 |
| JP | 2009137340 A | 6/2009 |
| JP | 2010013042 A | 1/2010 |

* cited by examiner

VEHICLE, METHOD FOR CONTROLLING VEHICLE, AND CONTROL DEVICE OF VEHICLE

CROSS REFERENCE TO RELATED APPLICATION

This is a National Stage of International Application No. PCT/JP2011/068045 filed Aug. 8, 2011, the contents of all of which is incorporated herein by reference in its entirety.

TECHNICAL FIELD

The present invention relates to a vehicle, a method for controlling a vehicle, and a control device of a vehicle, and more particularly relates to a technique of generating electric power by operating an engine and charging a power storage device.

BACKGROUND ART

A hybrid vehicle on which an electric motor for running is mounted in addition to an engine, and an electric vehicle equipped with a cruising distance extension function (range extender) are known. In these vehicles, when the vehicular speed is low, for example, the engine is stopped, and only the electric motor is used as a drive source. As described in Japanese Patent Laying-Open No. 2002-262401 (PTD 1), there is a case in which, when the remaining capacity of a power storage device, such as a battery, decreases to a threshold value even if the vehicular speed is low, the engine is forcedly started for driving a power generator and a battery is charged.

CITATION LIST

Patent Document

PTD 1: Japanese Patent Laying-Open No. 2002-262401

SUMMARY OF INVENTION

Technical Problem

However, when the engine is forcedly started because of a reduction in the remaining capacity of the battery, a passenger may feel discomfort.

An object of the present invention is to reduce discomfort given to the passenger.

Solution to Problem

In an embodiment, a vehicle includes an engine, a power storage device storing electric power generated by operating the engine, and a control device allowing the engine to stop in the state where a remaining capacity of the power storage device is larger than a first threshold value. When the engine is started by a factor different from a reduction in the remaining capacity of the power storage device in the state where the remaining capacity of the power storage device is smaller than the first threshold value, the control device causes the engine to operate and causes the power storage device to be charged until the remaining capacity of the power storage device increases to a second threshold value which is larger than the first threshold value.

According to this configuration, when the engine is started by a factor different from a reduction in the remaining capacity of the power storage device, the power storage device is forcedly charged to increase the remaining capacity to the second threshold value. Accordingly, the frequency in which the engine is started because of a reduction in the remaining capacity of the power storage device can be reduced. Therefore, discomfort given to the passenger can be reduced.

In another embodiment, when the engine is started by a driver's operation of an accelerator pedal in the state where the remaining capacity of the power storage device is smaller than the first threshold value, the control device causes the engine to operate and causes the power storage device to be charged until the remaining capacity of the power storage device increases to the second threshold value.

According to this configuration, when the engine is started in the state where a driver can expect that the engine will be started, the power storage device can be forcedly charged.

In still another embodiment, when the remaining capacity of the power storage device decreases to a third threshold value which is smaller than the first threshold value with the engine stopped, the control device causes the engine to be started, and causes the engine to operate and causes the power storage device to be charged until the remaining capacity of the power storage device increases to the second threshold value.

According to this configuration, when the remaining capacity of the power storage device decreases to the third threshold value, the engine is forcedly started and the power storage device can be charged, regardless of the passenger's intention.

In still another embodiment, when the engine is started in the state where the remaining capacity of the power storage device is larger than the first threshold value, the control device allows the engine to stop in the state where the remaining capacity of the power storage device is smaller than the second threshold value.

According to this configuration, when the engine is started in the state where the remaining capacity of the power storage device is larger than the first threshold value, the engine may be stopped even if the remaining capacity of the power storage device is smaller than the second threshold value. Accordingly, the frequency in which the engine is stopped can be increased.

Advantageous Effects of Invention

When the engine is started by a factor different from a reduction in the remaining capacity of the power storage device, the power storage device is forcedly charged. Accordingly, the frequency in which the engine is started because of a reduction in the remaining capacity of the power storage device can be reduced. Therefore, discomfort given to the passenger can be reduced.

DESCRIPTION OF EMBODIMENTS

Hereinafter, an embodiment of the present invention will be described in detail with reference to the drawings. In the following description, the same portions have the same reference characters allotted. They are named and function identically. Therefore, detailed description thereof will not be repeated.

Figure 1:
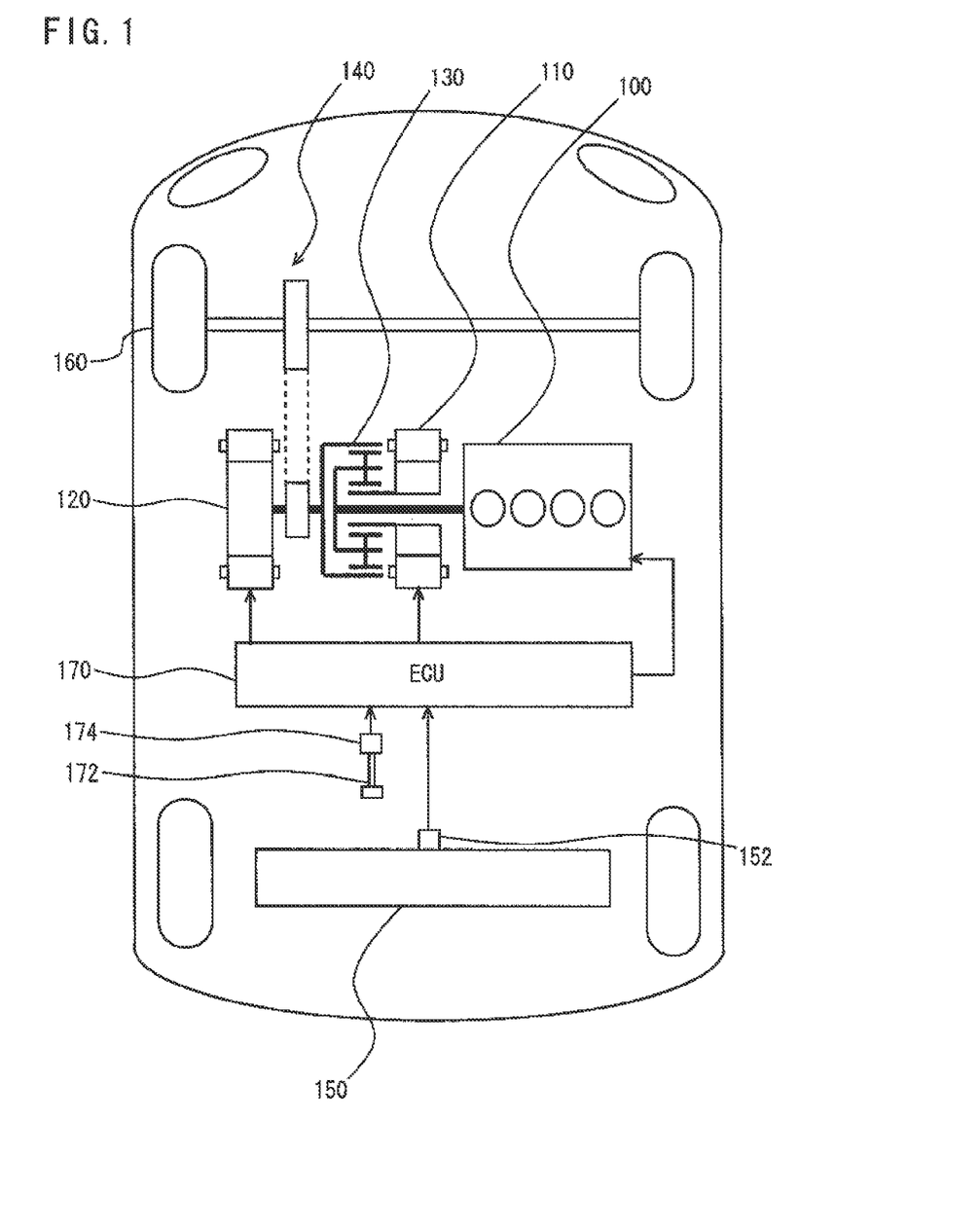
FIG. 1 is a schematic structural diagram showing a hybrid vehicle.

Referring to FIG. 1, a hybrid vehicle has mounted thereon an engine 100, a first motor generator 110, a second motor generator 120, a power split device 130, a reduction gear 140, and a battery 150. It is noted that, although a hybrid vehicle not having a function to be charged by an external power supply will be described below as an example, a plug-in hybrid vehicle having a function to be charged by an external power supply may be adopted.

Engine 100, first motor generator 110, second motor generator 120, and battery 150 are controlled by an ECU (Electronic Control Unit) 170. ECU 170 may be divided into a plurality of ECUs.

This vehicle runs with driving force from at least one of engine 100 and second motor generator 120. That is, one or both of engine 100 and second motor generator 120 are automatically selected as a drive source in accordance with the driving condition.

For example, engine 100 and second motor generator 120 are controlled in accordance with the result that a driver operates an accelerator pedal 172. The pedal position (accelerator press-down degree) of accelerator pedal 172 is detected by an accelerator press-down degree sensor 174.

When the accelerator press-down degree is small or when the vehicular speed is low, for example, the hybrid vehicle runs with only second motor generator 120 serving as a drive source. In this case, engine 100 is stopped. However, engine 100 may be driven for power generation or the like.

Moreover, when the accelerator press-down degree is great, when the vehicular speed is high, when the remaining capacity (SOC: State Of Charge) of battery 150 is small, for example, engine 100 is driven. In this case, the hybrid vehicle runs with only engine 100 or both engine 100 and second motor generator 120 serving as a drive source. The remaining capacity of battery 150 is calculated by ECU 170 from input/output current, voltage, and the like of battery 150. Since a well-known common method should only be adopted as the method for calculating the remaining capacity of battery 150, detailed description thereof will not be repeated here.

Engine 100 is an internal combustion engine. An air-fuel mixture of fuel and air is ignited in a combustion chamber, so that a crankshaft serving as an output shaft is rotated.

Engine 100, first motor generator 110 and second motor generator 120 are connected via power split device 130. Motive power produced by engine 100 is split into two paths by power split device 130. One of the paths is to drive a front wheel 160 via reduction gear 140. The other one is to drive first motor generator 110 for power generation.

First motor generator 110 is a three-phase AC rotating electric machine having a U-phase coil, a V-phase coil and a W-phase coil. First motor generator 110 generates electric power with motive power of engine 100 split by power split device 130. The electric power generated by first motor generator 110 is properly used in accordance with the running state of the vehicle and the state of the remaining capacity of battery 150. For example, at the time of normal running, the electric power generated by first motor generator 110 will be electric power for driving second motor generator 120 as it is. On the other hand, when SOC of battery 150 is lower than a predetermined value, the electric power generated by first motor generator 110 is converted from alternating current to direct current by an inverter which will be described later, and then will be adjusted in voltage by a converter which will be described later for storage in battery 150.

When first motor generator 110 is functioning as a power generator, first motor generator 110 produces negative torque. Here, negative torque refers to torque that applies load to engine 100. When first motor generator 110 is functioning as a motor receiving supply of electric power, first motor generator 110 produces positive torque. Here, positive torque refers to torque that does not apply load to engine 100, that is, torque that helps engine 100 to rotate. It is noted that the same applies to second motor generator 120.

Second motor generator 120 is a three-phase AC rotating electric machine having a U-phase coil, a V-phase coil and a W-phase coil. Second motor generator 120 is driven with at least one of electric power stored in battery 150 and electric power generated by first motor generator 110.

The driving force of second motor generator 120 is transmitted to front wheel 160 via reduction gear 140. Accordingly, second motor generator 120 assists engine 100, or causes the vehicle to run with the driving force from second motor generator 120. It is noted that a rear wheel may be driven instead of or in addition to front wheel 160.

At the time of regenerative braking of the hybrid vehicle, second motor generator 120 is driven by front wheel 160 via reduction gear 140, and second motor generator 120 operates as a power generator. Accordingly, second motor generator 120 operates as a regenerative brake that converts braking energy into electric power. Electric power generated by second motor generator 120 is stored in battery 150.

Power split device 130 is implemented by planetary gears including a sun gear, a pinion gear, a carrier, and a ring gear. The pinion gear is engaged with the sun gear and the ring gear. The carrier supports the pinion gear so as to be rotatable by itself. The sun gear is coupled to the rotation shaft of first motor generator 110. The carrier is coupled to the crankshaft of engine 100. The ring gear is coupled to a rotation shaft of second motor generator 120 and reduction gear 140.

Engine 100, first motor generator 110 and second motor generator 120 are coupled via power split device 130 implemented by the planetary gears, so that the speeds of engine 100, first motor generator 110 and second motor generator 120 have a relationship connected with a straight line in a nomographic chart.

Battery 150 is a battery pack obtained by connecting a plurality of battery modules in series, each of the battery modules being obtained by integrating a plurality of battery cells. The voltage of battery 150 is approximately 200V, for example. Battery 150 is charged with electric power supplied not only from first motor generator 110 and second motor generator 120 but also from a power supply outside the vehicle. It is noted that a capacitor may be used instead of or in addition to battery 150. The temperature of battery 150 is detected by a temperature sensor 152.

Figure 2:
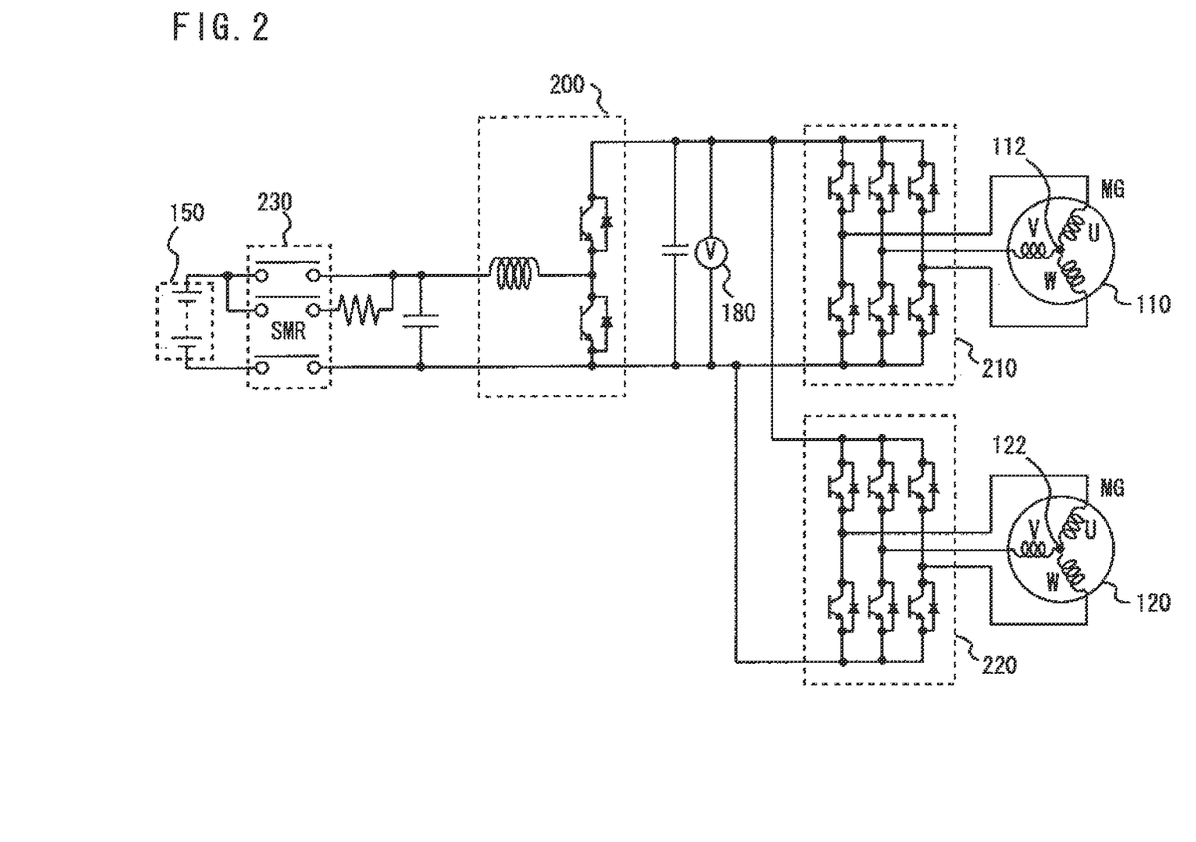
FIG. 2 shows an electrical system of the hybrid vehicle.

Referring to FIG. 2, an electrical system of the hybrid vehicle will be described further. The hybrid vehicle is provided with a converter 200, a first inverter 210, a second inverter 220, and a system main relay 230.

Converter 200 includes a reactor, two npn-type transistors and two diodes. The reactor has one end connected to the anode side of each battery and the other end connected to a node of the two npn-type transistors.

The two npn-type transistors are connected in series. The npn-type transistors are controlled by ECU 170. A diode is connected across the collector and emitter of each npn-type transistor so as to flow a current from the emitter side to the collector side.

It is noted that the npn-type transistors can be implemented by IGBT (Insulated Gate Bipolar Transistor), for example. Instead of the npn-type transistors, power switching elements, such as power MOSFETs (Metal Oxide Semiconductor Field-Effect Transistors) can be used.

When supplying electric power discharged from battery 150 to first motor generator 110 or second motor generator 120, the voltage is boosted by converter 200. In contrast, when charging battery 150 with electric power generated by first motor generator 110 or second motor generator 120, the voltage is stepped down by converter 200.

A system voltage VH across converter 200 and each inverter is detected by a voltage sensor 180. The result of detection by voltage sensor 180 is transmitted to ECU 170.

First inverter 210 includes a U-phase arm, a V-phase arm and a W-phase arm. The U-phase arm, the V-phase arm and the W-phase arm are connected in parallel. The U-phase arm, the V-phase arm and the W-phase arm each have two npn-type transistors connected in series. A diode is connected across the collector and emitter of each npn-type transistor so as to flow a current from the emitter side to the collector side. The node of the respective npn-type transistors in each arm is connected to an end different from a neutral point 112 of each coil of first motor generator 110.

First inverter 210 converts a direct current supplied from battery 150 into an alternating current for supply to first motor generator 110. First inverter 210 also converts an alternating current generated by first motor generator 110 into a direct current.

Second inverter 220 includes a U-phase arm, a V-phase arm and a W-phase arm. The U-phase arm, the V-phase arm and the W-phase arm are connected in parallel. The U-phase arm, the V-phase arm and the W-phase arm each have two npn-type transistors connected in series. A diode is connected across the collector and emitter of each npn-type transistor so as to flow a current from the emitter side to the collector side. The node of the respective npn-type transistors in each arm is connected to an end different from a neutral point 122 of each coil of second motor generator 120.

Second inverter 220 converts a direct current supplied from battery 150 into an alternating current for supply to second motor generator 120. Second inverter 220 also converts an alternating current generated by second motor generator 120 into a direct current.

Converter 200, first inverter 210 and second inverter 220 are controlled by ECU 170.

System main relay 230 is provided across battery 150 and converter 200. System main relay 230 is a relay for switching between the state in which battery 150 and the electrical system are connected and the state in which battery 150 and the electrical system are disconnected. When system main relay 230 is in the open state, battery 150 is disconnected from the electrical system. When system main relay 230 is in the close state, battery 150 is connected to the electrical system.

The state of system main relay 230 is controlled by ECU 170. For example, when ECU 170 is activated, system main relay 230 is closed. When ECU 170 is stopped, system main relay 230 is opened.

Figure 3:
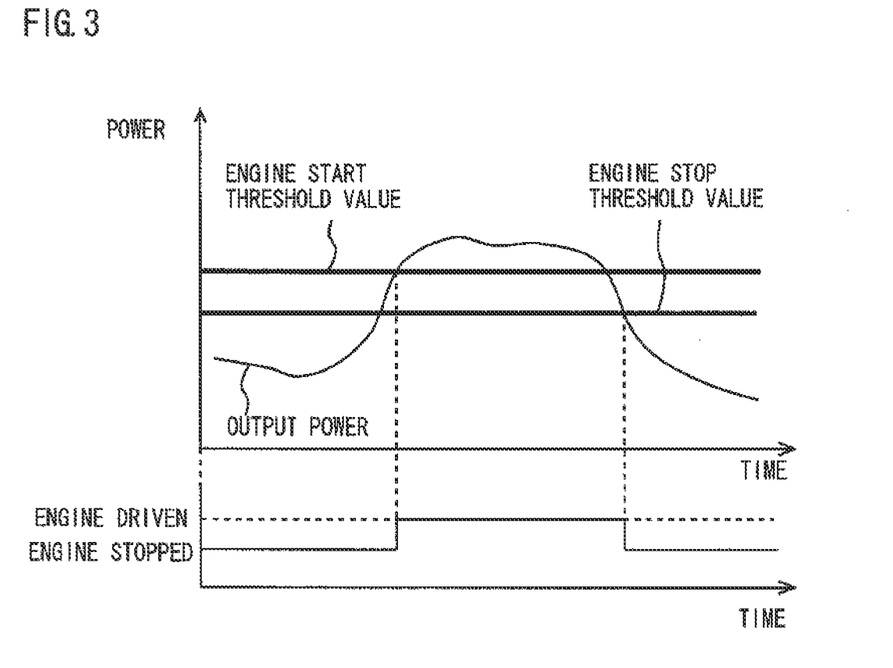
FIG. 3 shows a period in which the engine is driven and a period in which the engine is stopped.

Referring to FIG. 3, the control mode of engine 100 will be further described. As shown in FIG. 3, when output power of the hybrid vehicle becomes more than or equal to an engine start threshold value, engine 100 is driven. For example, by cranking engine 100 with first motor generator 110, engine 100 is started. Accordingly, the hybrid vehicle runs with driving force of engine 100 in addition to or instead of driving force of second motor generator 120. Electric power generated by first motor generator 110 using driving force of engine 100 is directly supplied to second motor generator 120.

The output power is set up as power used for running of the hybrid vehicle. The output power is calculated by ECU 170 in accordance with, for example, a map having the accelerator press-down degree, the vehicular speed and the like as parameters. It is noted that the method for calculating the output power is not limited to this. Instead of the output power, torque, acceleration, driving force, accelerator press-down degree, or the like may be used. For example, engine 100 may be driven when the accelerator press-down degree is more than or equal to a threshold value determined for every vehicular speed.

On the other hand, when the output power of the hybrid vehicle is smaller than the engine start threshold value, the hybrid vehicle runs only with driving force of second motor generator 120. In this case, in principle, fuel supply to engine 100 is stopped, and engine 100 is stopped.

Figure 4:
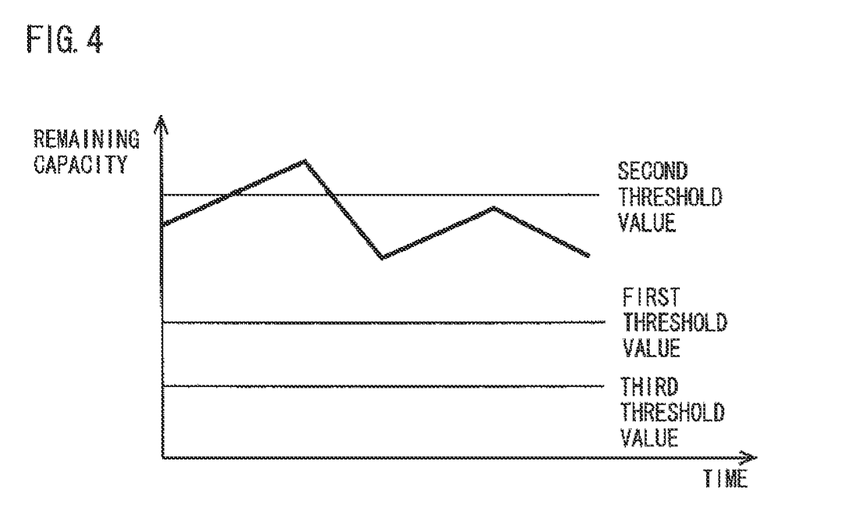
FIG. 4 shows a first threshold value, a second threshold value and a third threshold value.

Engine 100 is allowed to stop in the state where the remaining capacity of battery 150 is larger than the first threshold value shown in FIG. 4. The first threshold value is equivalent to a value obtained by adding a margin previously determined by a developer to a third threshold value which will be described later.

When engine 100 is started by a factor different from a reduction in the remaining capacity of battery 150 in the state where the remaining capacity of battery 150 is smaller than the first threshold value, battery 150 is forcedly charged until the remaining capacity of battery 150 increases to the second threshold value which is larger than the first threshold value.

That is, when engine 100 is started by a factor different from a reduction in the remaining capacity of battery 150 after the remaining capacity of battery 150 falls below the first threshold value with engine 100 stopped, battery 150 is forcedly charged until the remaining capacity of battery 150 increases to the second threshold value which is larger than the first threshold value.

In the forced charging of battery 150, engine 100 is not allowed to stop, but engine 100 is operated and battery 150 is charged with electric power generated by first motor generator 110. The second threshold value indicates the remaining capacity when the forced charging of battery 150 is terminated.

As an example, when traveling power exceeds an engine start threshold value by the driver's operation of accelerator pedal 172 and engine 100 is started in the state where the remaining capacity of battery 150 is smaller than the first threshold value, then, engine 100 is forcedly operated and battery 150 is charged until the remaining capacity of battery 150 increases to the second threshold value.

Figure 5:
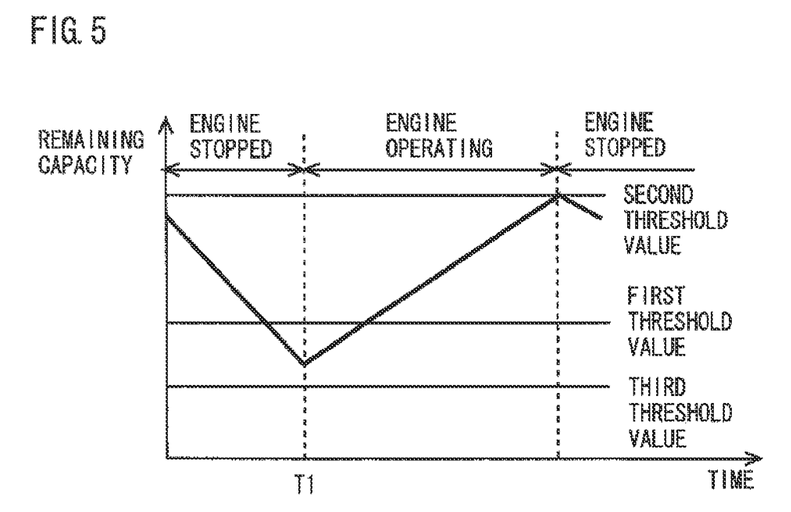
FIG. 5 is a (first) diagram showing a transition of remaining capacity of a battery.

FIG. 5 shows a transition of the remaining capacity when engine 100 is started by a factor different from a reduction in the remaining capacity of battery 150 in the state where the remaining capacity of battery 150 is smaller than the first threshold value. In FIG. 5, the remaining capacity of battery 150 decreases until engine 100 is started at time T1. After time T1, the remaining capacity increases to the second threshold value. Engine 100 is forbidden to stop until the remaining capacity of battery 150 increases to the second threshold value.

Figure 6:
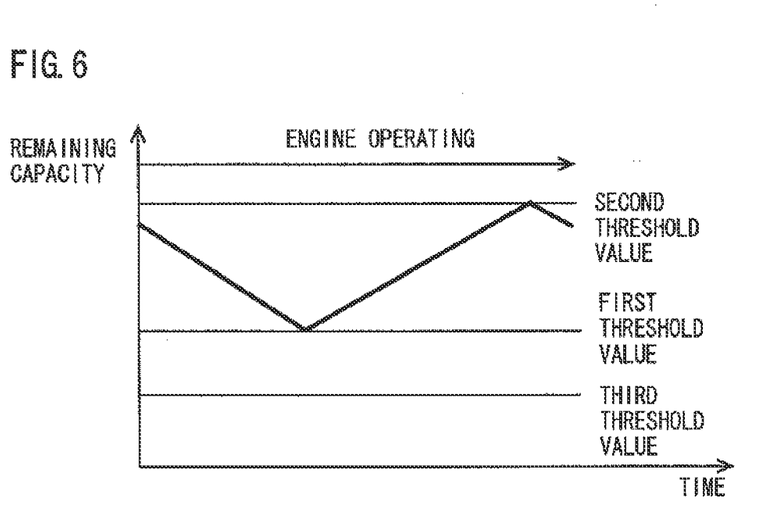
FIG. 6 is a (second) diagram showing a transition of remaining capacity of a battery.

Similarly, as shown in FIG. 6, when the remaining capacity of battery 150 decreases to the first threshold value with engine 100 operated, battery 150 is forcedly charged with electric power generated by first motor generator 110 until the remaining capacity of battery 150 increases to the second threshold value. Engine 100 is forbidden to stop until the remaining capacity of battery 150 increases to the second threshold value.

On the other hand, when traveling power exceeds the engine start threshold value by the driver's operation of accelerator pedal 172, for example, and engine 100 is started in the state where the remaining capacity of battery 150 is larger than the first threshold value, then, engine 100 is allowed to stop even if the remaining capacity of battery 150 is smaller than the second threshold value.

Figure 7:
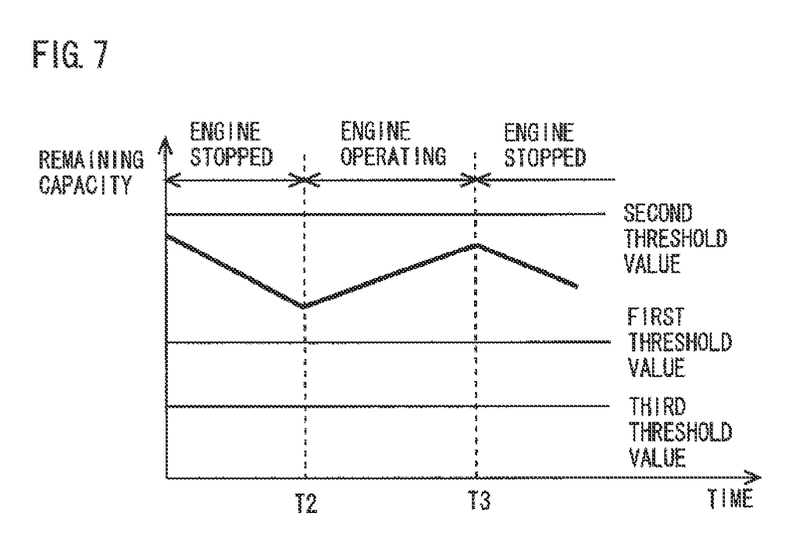
FIG. 7 is a (third) diagram showing a transition of remaining capacity of a battery.

FIG. 7 shows a transition of the remaining capacity when engine 100 is started in the state where the remaining capacity of battery 150 is larger than the first threshold value. In FIG. 7, the remaining capacity of battery 150 decreases until engine 100 is started at time T2. After time T2, the remaining capacity of battery 150 increases until engine 100 is stopped at time T3. After time T3, the remaining capacity decreases again.

Figure 8:
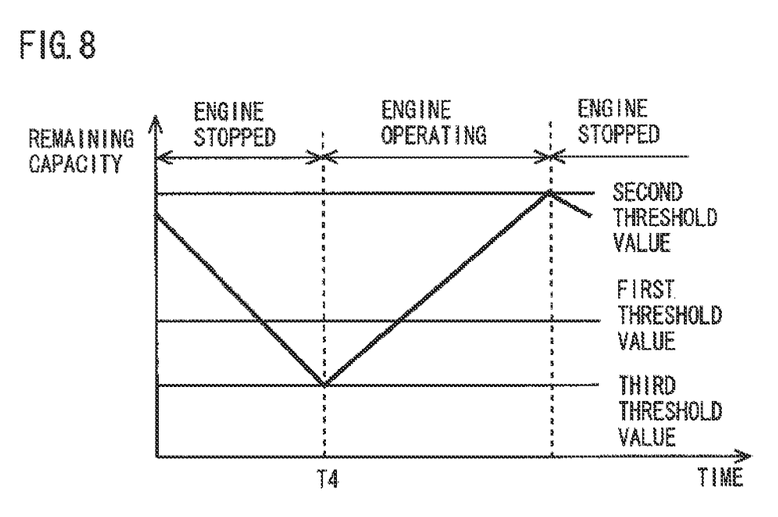
FIG. 8 is a (fourth) diagram showing a transition of remaining capacity of a battery.

As shown in FIG. 8, when the remaining capacity of battery 150 decreases to the third threshold value which is smaller than the first threshold value with engine 100 stopped, engine 100 is forcedly started and battery 150 is charged until the remaining capacity of battery 150 increases to the second threshold value. Therefore, engine 100 is forcedly operated and battery 150 is charged until the remaining capacity of battery 150 increases to the second threshold value. Even if the driver is not operating accelerator pedal 172 and traveling power is smaller than the engine start threshold value, engine 100 is started, and engine 100 is operated and battery 150 is charged until the remaining capacity of battery 150 increases to the second threshold value.

The third threshold value indicates the remaining capacity when forced charging of battery 150 is started in the case where the remaining capacity of battery 150 has decreased with engine 100 stopped.

In FIG. 8, the remaining capacity of battery 150 decreases until engine 100 is started at time T4. After time T4, the remaining capacity increases to the second threshold value.

Figure 9:
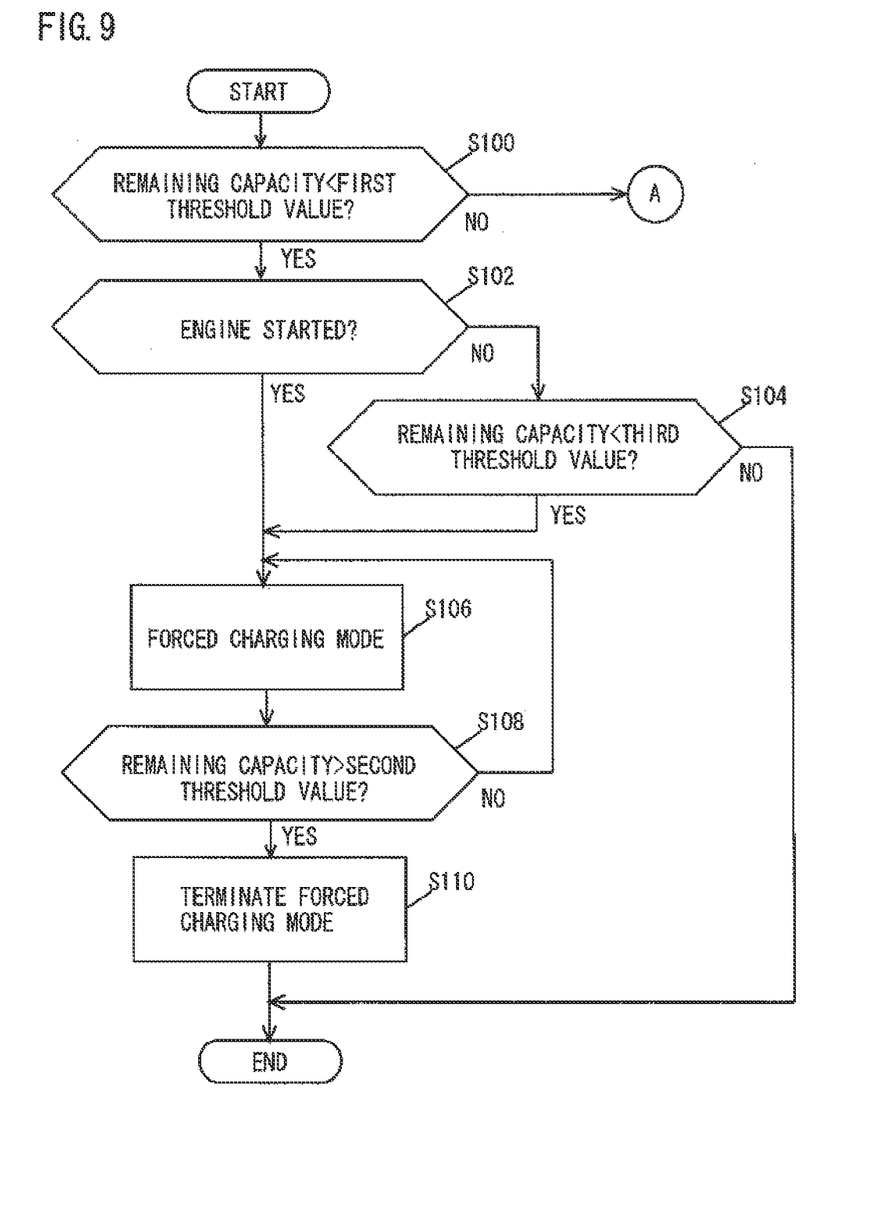
FIG. 9 is a (first) flowchart showing processing executed by ECU.
Figure 10:
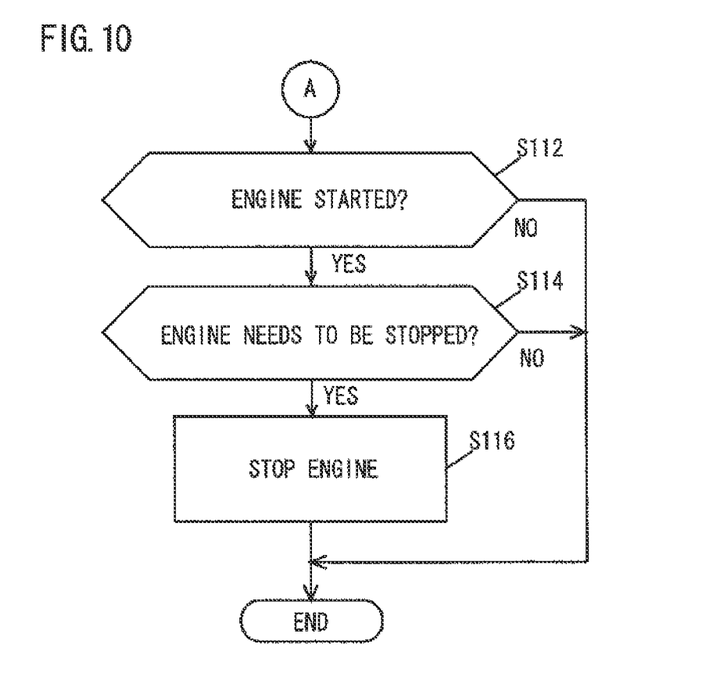
FIG. 10 is a (second) flowchart showing processing executed by ECU.

Referring to FIGS. 9 and 10, processing executed by ECU 170 will be described. It is noted that the processing which will be described below may be achieved by software, by hardware, or by cooperation of software and hardware. The processing which will be described below is executed in the state where engine 100 is stopped, as an example.

In step (hereinafter, step will be abbreviated to S) 100, it is determined whether or not the remaining capacity of battery 150 is smaller than the first threshold value. When the remaining capacity of battery 150 is smaller than the first threshold value (YES in S100), it is determined in S102 whether or not engine 100 has been started by a factor different from a reduction in the remaining capacity of battery 150. As an example, it is determined whether or not engine 100 has been started by the driver's operation of accelerator pedal 172. More specifically, it is determined whether or not traveling power has exceeded the engine start threshold value.

When engine 100 has been started (YES in S102), engine 100 and first motor generator 110 are controlled in a forced charging mode in S106. Therefore, engine 100 is operated and battery 150 is forcedly charged with electric power generated by first motor generator 110 until the remaining capacity of battery 150 increases to the second threshold value.

When engine 100 remains stopped (NO in S102), it is determined in S104 whether or not the remaining capacity of battery 150 is smaller than the third threshold value.

When the remaining capacity of battery 150 is smaller than the third threshold value (YES in 104), engine 100 and first motor generator 110 are controlled in the forced charging mode in S106. Therefore, engine 100 is started, and engine 100 is operated and battery 150 is forcedly charged with electric power generated by first motor generator 110 until the remaining capacity of battery 150 increases to the second threshold value.

When the remaining capacity of battery 150 exceeds the second threshold value during the forced charging mode (YES in S108), the forced charging mode is terminated in S110. Therefore, charging of battery 150 is stopped. When traveling power is smaller than the engine start threshold value, engine 100 is stopped.

On the other hand, when traveling power exceeds the engine start threshold value by the driver's operation of accelerator pedal 172, for example, and engine 100 is started (YES in S112) in the state where the remaining capacity of battery 150 is more than or equal to the first threshold value (NO in S100), it is determined in S114 whether or not engine 100 needs to be stopped.

For example, when traveling power falls below the engine start threshold value, it is determined that engine 100 needs to be stopped (YES in S114), and engine 100 is stopped in S116. Therefore, engine 100 is allowed to stop.

It should be understood that the embodiment disclosed herein is illustrative and non-restrictive in every respect. The scope of the present invention is defined by the claims not by the description above, and is intended to include any modification within the meaning and scope equivalent to the claims.

REFERENCE SIGNS LIST 100 engine; 110 first motor generator; 120 second motor generator; 130 power split device; 140 reduction gear; 150 battery; 160 front wheel; 170 ECU; 172 accelerator pedal; 174 accelerator press-down degree sensor.

The invention claimed is:
1. A vehicle comprising: an engine;
a power storage device storing electric power generated by operating said engine; and
a control device controlling said engine,
when said engine is started by a driver's operation of an accelerator pedal as a factor different from a reduction in the remaining capacity of said power storage device in the state
where the remaining capacity of said power storage device is smaller than said first threshold value, said control device forbidding said engine to stop to charge said power storage device until the remaining capacity of said power storage device increases to a second threshold value which is larger than said first threshold value, and
when said engine is started by the driver's operation of the accelerator pedal as the factor different from the reduction in the remaining capacity of said power storage device in the state where the remaining capacity of said power storage device is larger than said first threshold value, said control device allowing said engine to stop in the state where the remaining capacity of said power storage device is smaller than said second threshold value.

2. The vehicle according to claim 1, wherein when the remaining capacity of said power storage device decreases to a third threshold value which is smaller than said first threshold value with said engine stopped, said control device causes said engine to be started, and forbids said engine to stop until the remaining capacity of said power storage device increases to said second threshold value.

3. A method for controlling a vehicle including an engine and a power storage device storing electric power generated by operating said engine, comprising:
   allowing said engine to stop in the state where a remaining capacity of said power storage device is larger than a first threshold value;
   when said engine is started by a driver's operation of an accelerator pedal as a factor different from a reduction in the remaining capacity of said power storage device in the state where the remaining capacity of said power storage device is smaller than said first threshold value, forbidding said engine to stop to charge said power storage device until the remaining capacity of said power storage device increases to a second threshold value which is larger than said first threshold value; and
   when said engine is started by the driver's operation of the accelerator pedal as the factor different from the reduction in the remaining capacity of said power storage device in the state where the remaining capacity of said power storage device is larger than said first threshold value, allowing said engine to stop in the state where the remaining capacity of said power storage device is smaller than said second threshold value.

4. A control device of a vehicle including an engine and a power storage device storing electric power generated by operating said engine, comprising:
   means for allowing said engine to stop in the state where a remaining capacity of said power storage device is larger than a first threshold value;
   means for, when said engine is started by a driver's operation of an accelerator pedal as a factor different from a reduction in the remaining capacity of said power storage device in the state where the remaining capacity of said power storage device is smaller than said first threshold value, operating said engine and charging said power storage device until the remaining capacity of said power storage device increases to a second threshold value which is larger than said first threshold value; and
   means for, when said engine is started by the driver's operation of the accelerator pedal as the factor different from the reduction in the remaining capacity of said power storage device in the state where the remaining capacity of said power storage device is larger than said first threshold value, allowing said engine to stop in the state where the remaining capacity of said power storage device is smaller than said second threshold value.

* * * * *